United States Patent
Harma

(10) Patent No.: US 9,661,139 B2
(45) Date of Patent: May 23, 2017

(54) CONVERSATION DETECTION IN AN AMBIENT TELEPHONY SYSTEM

(75) Inventor: Aki Sakari Harma, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 771 days.

(21) Appl. No.: 13/063,764

(22) PCT Filed: Sep. 9, 2009

(86) PCT No.: PCT/IB2009/053937
§ 371 (c)(1),
(2), (4) Date: Mar. 14, 2011

(87) PCT Pub. No.: WO2010/032164
PCT Pub. Date: Mar. 25, 2010

(65) Prior Publication Data
US 2011/0164742 A1    Jul. 7, 2011

(30) Foreign Application Priority Data
Sep. 18, 2008    (EP) ................................. 08164553

(51) Int. Cl.
H04M 3/56    (2006.01)
H04M 1/60    (2006.01)
(Continued)

(52) U.S. Cl.
CPC .......... H04M 3/56 (2013.01); H04M 1/6033 (2013.01); G10L 25/78 (2013.01); H04L 65/1096 (2013.01);
(Continued)

(58) Field of Classification Search
CPC ... H04M 1/6033; H04M 1/0297; G10L 25/78; H04L 65/1096; F21V 23/0471; F21V 33/0056
(Continued)

(56) References Cited

U.S. PATENT DOCUMENTS 5,861,907 A * 1/1999 Wada .......................... 348/14.09
6,766,019 B1    7/2004 Benesty et al.
(Continued)

FOREIGN PATENT DOCUMENTS

CN    101043759 B2    12/2010
EP    1168885 A2    1/2002
(Continued)

OTHER PUBLICATIONS

Alan Davis, "Statistical Voice Activity Detection Using Low-Variance Spectrum Estimation and an Adaptive Threshold", IEEE Transactions on Audio, Speech and Language Processing, vol. 14, No. 2, Mar. 2006.
(Continued)

*Primary Examiner* — Robert M Morlan
*Assistant Examiner* — Mandish Randhawa

(57) ABSTRACT

A method of controlling a conversation in an ambient telephone environment having a plurality of spaces includes providing a plurality of devices distributed in the plurality of spaces used by one or more users, at least one of the plurality of devices is connected to a telecommunications network for enabling communication between the environment and one or more remote terminals; and obtaining signals communicating a conversation between at least one remote terminal and at least one of the plurality of devices and audio from the one or more users. The method further includes identifying a user of the at least one device used in the obtained conversation by detecting interaction of a type corresponding to conversational turn-taking; and tracking movements of the user in the environment to determine its presence in a first of the plurality of spaces.

21 Claims, 4 Drawing Sheets

(51) Int. Cl.
*G10L 25/78* (2013.01)
*H04M 1/02* (2006.01)
*H04L 29/06* (2006.01)

(52) U.S. Cl.
CPC ...... *H04M 1/0297* (2013.01); *H04M 2201/40* (2013.01)

(58) Field of Classification Search
USPC .................................................. 370/260, 356
See application file for complete search history.

(56) References Cited

U.S. PATENT DOCUMENTS

| | | | |
|---|---|---|---|
| 8,271,287 B1* | 9/2012 | Kermani ........................ | 704/275 |
| 2002/0021790 A1* | 2/2002 | Corbett .................. | H04L 12/66 |
| | | | 379/93.23 |
| 2003/0210770 A1 | 11/2003 | Krejcarek | |
| 2005/0070312 A1* | 3/2005 | Seligmann et al. ....... | 455/456.6 |
| 2005/0088981 A1 | 4/2005 | Woodruff et al. | |
| 2005/0091693 A1* | 4/2005 | Amine et al. ................. | 725/100 |
| 2005/0251386 A1 | 11/2005 | Kuris | |
| 2007/0121606 A1* | 5/2007 | Scheinert ...................... | 370/356 |
| 2007/0286375 A1* | 12/2007 | Baum ................. | H04M 1/2474 |
| | | | 379/201.01 |
| 2007/0287474 A1* | 12/2007 | Jenkins et al. ............. | 455/456.2 |
| 2010/0273466 A1* | 10/2010 | Robertson et al. .......... | 455/416 |
| 2012/0106128 A1* | 5/2012 | Massara et al. ................ | 362/86 |
| 2013/0343206 A1* | 12/2013 | Wilhoite et al. .............. | 370/250 |

FOREIGN PATENT DOCUMENTS

| | | |
|---|---|---|
| EP | 1526706 A2 | 4/2005 |
| WO | 0048379 A1 | 8/2000 |
| WO | 0150290 A1 | 7/2001 |
| WO | 2007086042 A2 | 8/2007 |

OTHER PUBLICATIONS

Sahar E. Bou-Ghazale et al, "A Robust Endpoint Detection of Speech for Noisy Environments With Application to Automatic Speech Recognition", Proc. ICASSP 2002, Orlando, Florida, May 2002, pp. 3808-3811.

Liang-Sheng Huang et al, "A Novel Approach to Robust Speech Endpoint Detection in Car Environments", IEEE Int. Conf. on Acoustics, Speech and Signal Processing, 3(5-9), 2000, pp. 1751-1754.

Aki Harma, "Ambient Telephony: Scenarios and Research Challenges" Engineering Informatiaon, Inc. New York, NY, Aug. 31, 2007, 4 pages.

Paul M. Aoki et al, "The Mad Hatter'S Cocktail Party: A Social Mobile Audio Space Supporting Multiple Simultaneous Conversations", Conference Proceedings, Conference on Human Factors in Compunting Systems, Fort Lauderdale, FL, Apr. 5-10, 2003, pp. 425-432.

* cited by examiner

CONVERSATION DETECTION IN AN AMBIENT TELEPHONY SYSTEM

FIELD OF THE INVENTION

The invention relates to a method of controlling at least one device using a telecommunications system. The invention also relates to a telecommunications system and a computer program.

BACKGROUND OF THE INVENTION

Härmä, A., "Ambient telephony: scenarios and research challenges", *Proc. INTERSPEECH* 2007, August 2007 gives an overview of the technical challenges in developing a full-scale ambient telephone for the home environment. An ambient telephone is a speakerphone system based on arrays of loudspeakers and microphones, which are distributed in the home environment and are connected to each other via a home network. The system can receive calls from any source via a central device connected to the Internet, cellular phone network, and possibly the traditional land line. The audio rendering can be performed in a spatially selective way. For example, a user can carry on a conversation with another such that the other appears to be moving smoothly with the talker from one room to another, or such that there are several simultaneous connections open and the contacts are rendered in spatially separate positions in the home environment. The possibility of moving a call from one device and one spatial location to another is one of the central features of the ambient telephone.

In scenarios in which several simultaneous connections to remote callers are open at any one time, some remote callers may not actually be present at any given time. It would be useful if the ambient telephone system could adapt to changing use requirements without substantially complicating its use.

SUMMARY OF THE INVENTION

It is desirable to provide a method, system and computer program of the types mentioned above, which, in a scenario in which connections to remote terminals are open, allow for adaptation of the telephone system to changing requirements without requiring a great deal of explicit input from users.

The method is provided which includes:

obtaining signals communicating information from at least one remote telecommunication terminal and from at least one local input device for forming at least one local telecommunication terminal with at least one local output device, a connection being open between the remote and local telecommunications terminals;

analyzing information communicated from at least two of the telecommunication terminals over time in relation to each other, using at least one criterion for detecting interaction of a type corresponding to conversational turn-taking between users of the respective telecommunication terminals; and adjusting at least one output signal for controlling a device upon determining whether the at least one criterion is met.

By analyzing information communicated from the at least two telecommunication terminals over time in relation to each other using at least one criterion for detecting interaction of a type corresponding to conversational turn-taking between users of the respective telecommunication terminals, it can be detected whether the open connection or connections are in use. The user need not provide any additional commands for the system to detect whether conversations are ongoing. The local environment can be adapted in dependence on whether conversations with external callers are ongoing by providing the appropriate output signals to the at least one device. For example, devices that provide audible output can be muted in dependence on whether a conversation with an external caller is ongoing. The method takes account of the fact that many types of telecommunications networks allow for connections to be open persistently with little or no marginal costs to users. With such networks, open connections may not be in active use for prolonged periods of time. In effect, the method provides a type of presence management for such networks.

It is observed that US 2005/0251386 discloses a conversation detector comprising a signal pre-conditioner responsive to a source audio signal from a subject and producing a pres-emphasized signal; a comparator coupled to receive the pre-emphasized signal and generating pulses reduced in resolution and sample rate and indicative of at least one characteristic of the pre-emphasized signal; and an analysis unit responsive to the generated pulses and utilizing adaptive rules and an indicated characteristic of the pre-emphasized signal to determine therefrom existence of a conversation by a subject.

This known system only uses source audio signals from one microphone or other source for capturing a verbal presentation. There is no disclosure of obtaining signals communicating information from at least two telecommunication terminals between which a connection is open. It follows that there is also no disclosure of analyzing information communicated from the at least two telecommunication terminals over time in relation to each other using at least one criterion for detecting interaction of a type corresponding to conversational turn-taking between users of the respective telecommunication terminals. In fact, the known system can only discriminate between speech and background noise.

It is further observed that U.S. Pat. No. 6,766,019 discloses a method of double-talk detection for use in an acoustic echo canceller, the acoustic echo canceller for reducing unwanted echo generated in a receiving room which receives a far-end signal comprising incoming speech and which produces a return signal having the unwanted echo therein. This method comprises computing a normalized cross-correlation estimate representative of a cross-correlation between the far-end signal and the return signal normalized by a covariance of the far-end signal and further normalized by a variance of the return signal.

This known system does not carry out an analysis of information communicated from the at least two telecommunication terminals over time, and the analysis does not use at least one criterion for detecting interaction of a type corresponding to conversational turn-taking between users of the respective communication terminals. Rather a momentary analysis of whether an incoming signal and a local input signal are the same (indicating an echo) is carried out.

An embodiment of the method includes analyzing audio information communicated from at least two of the telecommunication terminals over time in relation to each other.

In contrast to e.g. video information, audio information above a certain threshold volume will come in bursts corresponding to the sources' contribution to a conversation. This makes it relatively easy to determine the existence of a conversation-like interaction between sources of two or more audio signals. Speech recognition is not required, whereas the determination of a conversation-like interaction on the basis of video information would generally require image analysis for detecting conversation-like interaction. This analysis could include, for example, the detection of lip movement based on facial detection and analysis, the automated recognition of gestures, such as movement of the hands during speech activity, and (virtual) eye contact during listening and talking. The analysis of an audiovisual signal is, it is noted, not precluded in this embodiment. Compared to text messages, audio information is more amenable to analysis to detect interactions of a type corresponding to conversational turn-taking. Text messages would generally also require at least analysis of the subject headings to determine whether they relate to a particular discussion, e.g. one hosted on an electronic forum. It is generally difficult to detect conversations on the basis of only the temporal flow of postings to such a forum.

A variant of this embodiment includes establishing a video link between telecommunication terminals upon detecting interaction of a type corresponding to conversational turn-taking between their respective users.

In this context, establishing can mean simply that a video signal being received from a remote terminal is now rendered on a local output device where previously no such output was provided in spite of the video information's being available. An effect already achieved in this variant is that screen space is made available at other times for other uses, e.g. rendering video content, such as television broadcasts, photo images, etc. Preferably, however, video data communication commences when the video link is established, so that, as an additional effect, economical use is made of available bandwidth.

In an embodiment, an output signal is provided to at least one device for producing an audible output, wherein the output signal causes an adjustment in the volume of the audible output.

An effect is to increase the intelligibility of speech information communicated to e.g. the local telecommunication terminal. A user of such a terminal can listen to music at a volume appropriate for full enjoyment of the music, until it is automatically determined that a conversation has been started.

An embodiment of the method includes, upon determining that the at least one criterion is not met in respect of at least one user of the local telecommunication terminal(s) and a user of a particular one of the remote telecommunication terminals, causing the information from the particular remote telecommunication terminal to cease to be reproduced by at least one local output device.

An effect is that a user of the remote telecommunication terminal need not actively terminate a call through a predetermined command for the connection between that terminal and a local terminal to be interrupted. Especially in systems that allow connections to remain open at little or no extra cost, this ensures that signals from remote telecommunication terminals are not continually reproduced in the environment of the local telecommunication terminal. In case of voice communications systems, the local users are not subjected to a permanent cacophony of background noise from remote telecommunication terminals.

An embodiment of the method includes, upon determining that the at least one criterion is not met in respect of a user at a particular location in relation to a plurality of the local input devices and local output devices and a user of a particular remote telecommunication terminal, causing the information communicated from the particular remote telecommunication terminal to be reproduced at a selected sub-set of the local output devices.

An effect is to allow for adjustment of an ambient telephony system in which connections "follow" a user from one location within a building to another. In this variant, only connections to those remote callers with whom a particular user is engaged in conversation-like interaction move with the user. On the one hand, this means that fewer connection have to be moved when a user moves. On the other hand, two or more user of local telecommunication terminals can each be provided with only information from those external callers with whom they are engaged in conversation. Especially where the two or more users are in different rooms, this makes conversations clearer, preventing confusion or even inaudibility of communication partners.

An embodiment of the method includes, upon determining that the at least one criterion is not met in respect of at least one particular user of the at least one local telecommunication terminal, adjusting at least one output signal for controlling a device in dependence on input received by at least one local input device.

An effect is to allow environmental settings at the local telecommunication terminal to be adjusted to several different use scenarios. In particular, the presence of input received by at least one local input device even where the user with whom the input originated is not determined to be engaged in a conversation is used as a cue e.g. to start speech analysis for a voice-activated user interface, or to adapt an environment to a conversation between two local users. The total absence of input may result in another set of adjustments, e.g. moving all devices for forming local telecommunication terminals into a "standby" mode.

An embodiment of the method includes, upon determining that the at least one criterion is met in respect of a user of the telecommunication terminals, communicating an identification associated with the user with a status indicator over a communications network. The identification may be of a terminal in association with which the user is registered. The message may be broadcast or otherwise transmitted to an overlay network, which may be a different one form the one used to communicate the information that is analyzed in order to detect interactions corresponding to conversational turn-taking. An effect is to implement automatically a system of presence management, which in particular does not rely on explicit user inputs.

An embodiment of the method includes, upon detecting interaction of a type corresponding to a conversation between a local user communicating information from fewer than all of a plurality of local input devices and a user of a particular remote telecommunication terminal, adjusting a selection of local input devices from which information is communicated to the particular remote telecommunication terminal.

An effect is that the remote user receives less background noise. The information from the local user is more intelligible to the remote user.

An embodiment includes, upon detecting interaction of a type corresponding to a conversation between a local user communicating information from fewer than all of a plurality of local input devices and a user of any remote telecommunication terminal, inferring a position of the local user on the basis of known positions of those local input devices.

In particular where the information is audio information, such an audio-based location method becomes much more powerful in combination with the conversation detection method proposed herein. In particular, it means that the location method is only carried out using signals determined to carry a user's contribution to a conversation-like interaction, and not, for example, background noise.

An embodiment of the method includes detecting that the at least one criterion is met in respect of users of a set of only remote telecommunication terminals and providing at least one signal for identifying the set of remote terminals to a system for establishing a direct connection between only the remote terminals forming the set.

An effect is to eliminate unnecessary call relaying and a large amount of background noise, in particular where the local telecommunication terminal is comprised in an ambient telephony system.

According to another aspect, the telecommunications system according to the invention includes:

a device for establishing a connection over a telecommunications network between at least one remote telecommunication terminal and an assembly of at least one local input device and at least one local output device for forming at least one local telecommunication terminal;

a signal processing system for processing signals communicating information from at least two of the telecommunications terminals between which a connection is open, wherein the signal processing system is arranged to analyze information communicated from the at least two telecommunication terminals over time in relation to each other, using at least one criterion for detecting interaction of a type corresponding to conversational turn-taking between users of the respective telecommunication terminals; and an interface for providing an output signal for controlling at least one device, wherein the system is arranged, upon determining whether the at least one criterion is met, to adjust the output signal in dependence on the result of the determination.

The telecommunication system is responsive to changes in circumstances without requiring explicit commands from users.

In an embodiment, the system is arranged to carry out a method according to the invention.

According to another aspect of the invention, there is provided a computer program including a set of instructions capable, when incorporated in a machine-readable medium, of causing a system having information processing capabilities to perform a method according to the invention.

BRIEF DESCRIPTION OF THE DRAWINGS

The invention will be described with reference to the accompanying drawings, in which.

DETAILED DESCRIPTION

Figure 1:
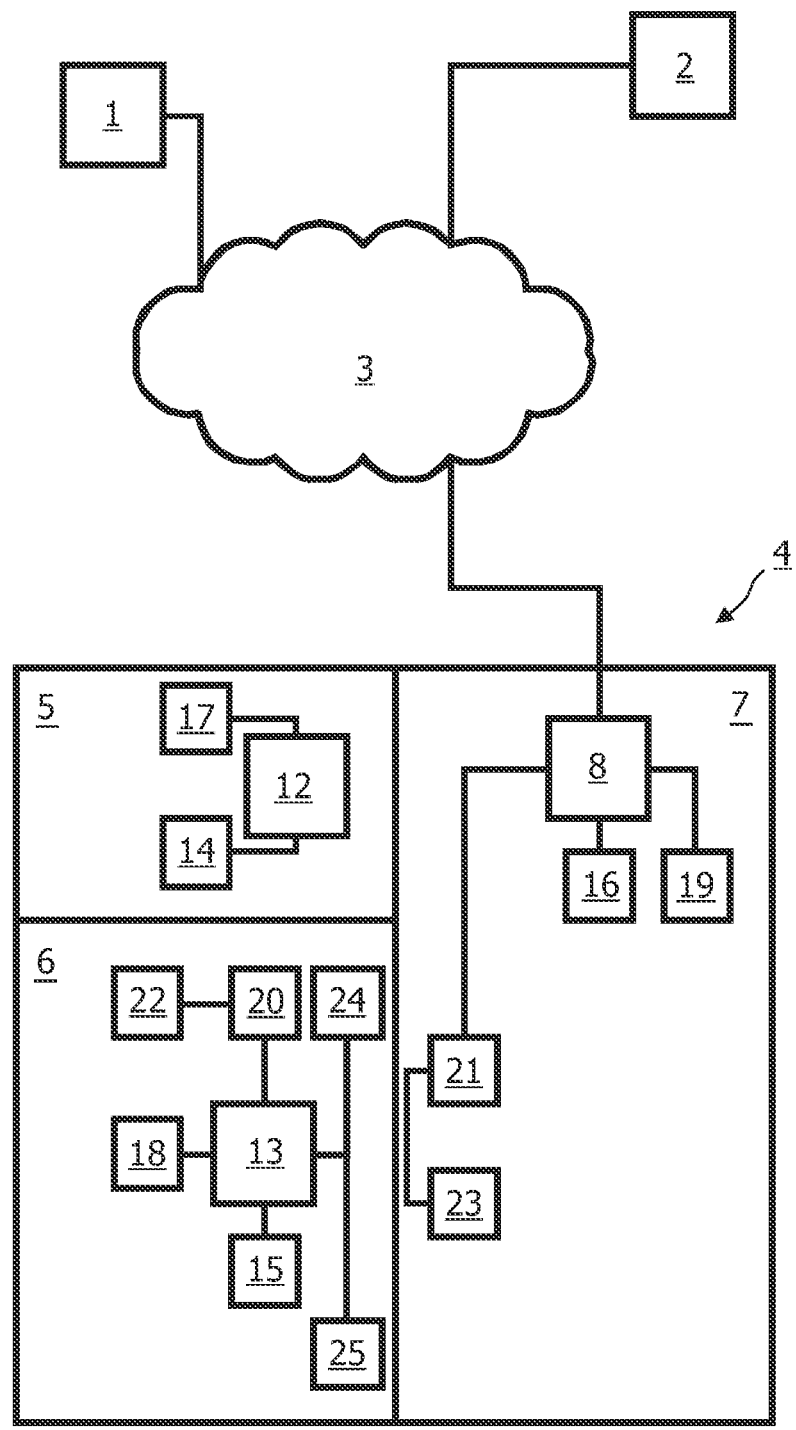
FIG. 1 illustrates schematically an ambient telephone system in a communications network including two remote terminals.

By way of example, two remote terminals 1, 2 connected to a telecommunications network 3 are shown in FIG. 1. A building 4 with three spaces 5-7 forms a local environment with at least one connection to the network 3.

The network 3 is a wide area network, and may include cellular telephone, POTS networks or broadband internet networks, for example. Communication may be via direct connection, but is preferably data packet-based. In the following it will be assumed that communication is voice-based with optional video images, such as is the case for videoconferencing applications. The same principles also find application in other methods of information communication between individuals, including text messaging, posting messages on bulletin boards, etc. In those other example, as in this example, information communicated from the remote terminal(s) 1, 2 and from real or virtual local terminals in the building 4 is analyzed over time in relation to each other using at least one criterion for detecting interaction of a type corresponding to conversational turn-taking between users of the respective terminals. Detected conversations are used to control session initiation, termination and management in the ambient telephone system, as well as optionally devices in the building 4. Information regarding detected conversations is also used to control audio rendering and capture by the ambient telephony system.

Network connectivity is increasingly based on flat-rate subscription models where call minutes do not count. Therefore, it is common to have very long calls or calls that are no longer either open or closed, but partially open in many different ways. Consequently, there will be many situations in which there are connections open to several remote terminals 1, 2, without the connection being used by users to communicate information. For example, a user may be signed in to a peer-to-peer overlay network, without even being near his computer.

In the illustrated embodiment, the ambient telephone system is constructed of individual networked phone units, preferably connected using a wireless network. However, the principles outlined herein also apply to systems in which multiple microphones and loudspeakers are connected to the same telephone system, e.g. a home intercom system or wired telephone system. The methods outlined herein are carried out by the ambient telephone system in this example, so that a distinction will be made between callers and users, callers being used to refer to users of remote terminals 1, 2 and user being used to refer to individuals within the building 4.

Figure 2:
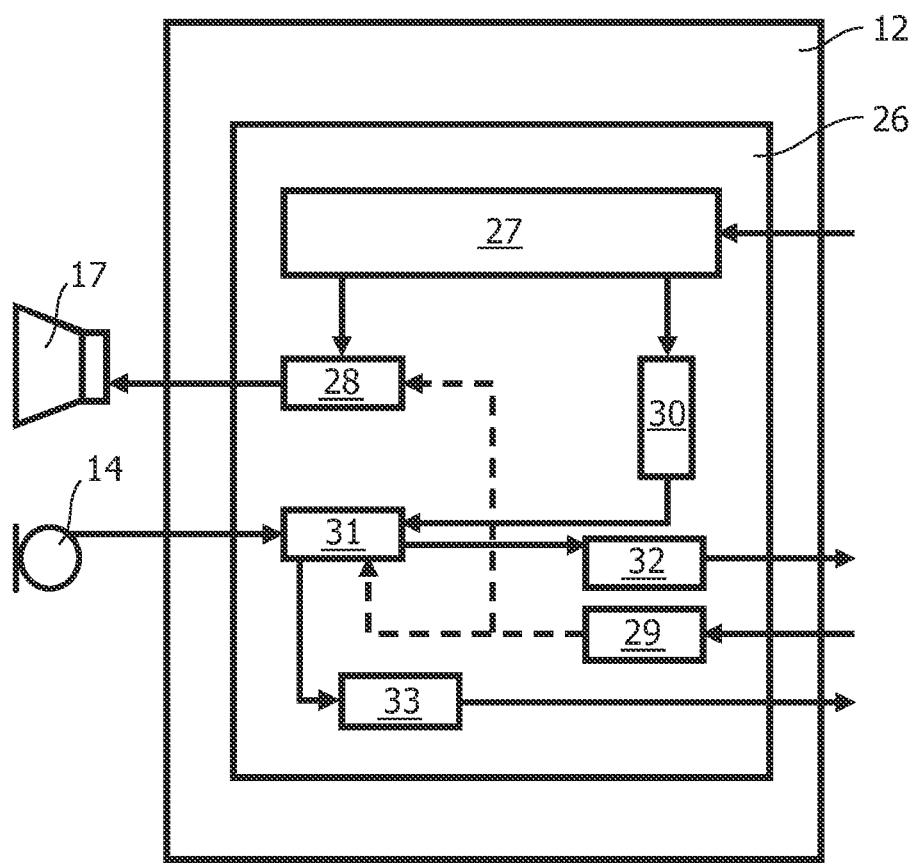
FIG. 2 illustrates schematically functional components of an individual phone device in the ambient telephone system.
Figure 3:
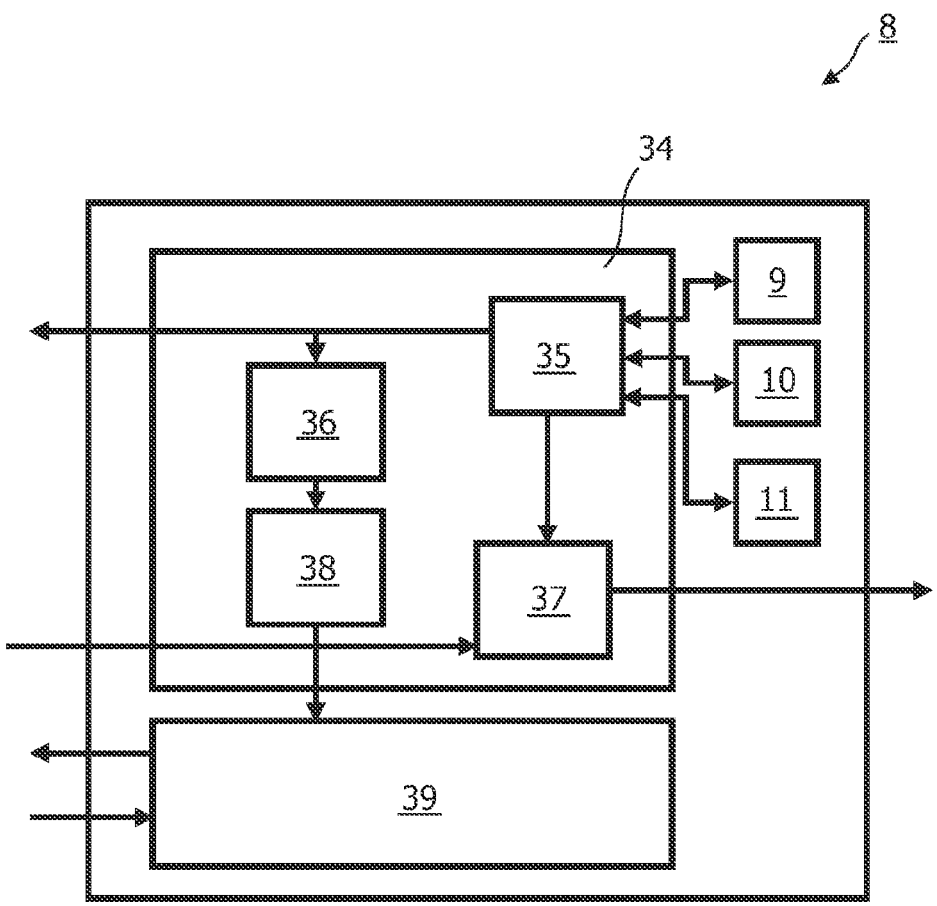
FIG. 3 illustrates schematically functional components of a master or proxy phone in the ambient telephone system.

A master phone unit 8 includes an interface to the telecommunications network 3, and is illustrated individually in FIG. 3. In the illustrated example, there are interfaces 9-11 to the Internet, a Plain Old Telephone System and to a cellular telephone network. Fewer and other types of interface may be used in alternative embodiments. The master phone unit 8 could also be regarded as a proxy phone unit, in the sense that other individual phone units 12, 13 communicate with the remote terminals 1, 2 via it. A first of the individual phone units 12 is illustrated in detail in FIG. 2, the others being identical. The master phone unit 8 comprises an individual phone unit in the ambient telephone system illustrated in FIG. 1.

Each individual phone unit 12, 13 and the master phone unit 8 interfaces with at least one microphone 14-16, and at least one speaker 17-19. In the illustrated embodiment, the second individual phone unit 13 and the individual phone unit comprised in the master phone unit 8 also interface with respective cameras 20, 21 and display devices 22, 23. Output signals can be provided from the second individual phone unit 13 to an external illumination device 24 and an entertainment device 25, such as a radio or television set. One or more of these connections may be via a wireless network also, or some network for home automation.

Referring to FIG. 2, a separate caller unit 26 is provided for each connection to a remote caller handled by the individual phone unit 12. An interface 27 includes a decoder and input buffer. In the illustrated example, the interface 27 comprises an RTP (Real-time Packet protocol) socket interface including a G.722 decoder and input buffer. It receives RTP data from an IP (Internet Protocol) socket (not shown).

A rendering unit 28 enables the decoded audio data to be rendered by the speaker 17. It operates at least partly under the control of a control unit 29, which also implements a geometric model, and in turn receives control signals in the form of messages, e.g. according to the SIP (Session Initiation Protocol) protocol and carried as TCP (Transmission Control Protocol) over IP packets, from the master phone unit 8. A delay line 30 is provided for providing a reference signal to an input signal processing unit 31. The reference signal enables the input signal processing unit 31 to perform acoustic echo cancellation. The input signal processing unit 31 also performs automatic gain control, and may perform other signal processing functions to provide a signal carrying audio information from a user. The input signal processing unit 31 also receives control signals from the control unit 29. The input signal processing unit provides a signal carrying audio information to a G.722 decoder and output RTP socket 32 and to a speech activity detection (SAD) system 33.

A typical SAD system 33 uses an algorithm that computes a number of characteristic features from a short audio segment and uses these to determine if the sound segment is speech, non-speech or silence. Any type of speech activity detection (also known as voice activity detection) algorithm can be implemented. Examples are given in:

Bhou-Gazale, S. and Assaleh, K., "A robust endpoint detection of speech for noisy environments with application to automatic speech recognition", *Proc. ICASSP 2002*, Orlando, Fla., May 2002;

Davis, A. et al., "Statistical voice activity detection using low/variance spectrum estimation and an adaptive threshold", *IEEE Trans. on audio, speech and language processing*, 14(2), 2006, pp. 412-424; and Huang, L, and Yang, C., "A novel approach to robust speech detection in car environments", *IEEE Int. Conf on Acoustics, Speech and Signal Processing*, 3(5-9), 2000, pp. 1751-1754.

It is observed that the functionality of the SAD system 33 can also be implemented only in the master phone unit 8, which receives the signal provided via the G.722 decoder and output RTP socket 32. This functionality can also be implemented as part of the echo cancellation and speech enhancement algorithm implemented in the input signal processing unit 31. The output of the speech activity detection is often a binary value. It can also be a confidence value, for example. The result of the speech activity detection for intervals of pre-determined duration is sent over the network in the building 4 to the master phone unit 8.

Referring to FIG. 3, the master phone unit 8 creates a call instance 34 for each external caller (corresponding to a remote terminal 1, 2 in this case) to which a connection is open. The call instance 34 makes use of a speech enhancement function 35 to provide a signal carrying audio information that is transmitted to one or more of the individual phone units 12,13. This signal is also subjected to speech activity detection 36. Both the output of the speech enhancement function 35 and other signals carrying audio information and associated with the call instance 34 are submitted to residual AEC 37, before being output, in particular to one or more of the speakers 17-19.

A conversational activity detection unit 38 receives the outputs from both the SAD system 33 in the first individual phone unit 12 and similar systems in the other individual phone units and from the speech activity detection function 36 applied to the information communicated from the remote terminal 1,2 with which the call instance 34 is associated. The outputs of the conversational activity detection unit 38 are values representing temporal probabilities of the presence of a conversation-like interaction between a caller using the associated remote terminal 1, 2 and a local user in an environment including one or more of the individual phone units 12, 13. These outputs are provided to a master control unit 39 for controlling the ambient telephony systems itself or a device external to it, such as the entertainment device 25 or the external illumination device 24, etc., as will be explained.

Figure 4:
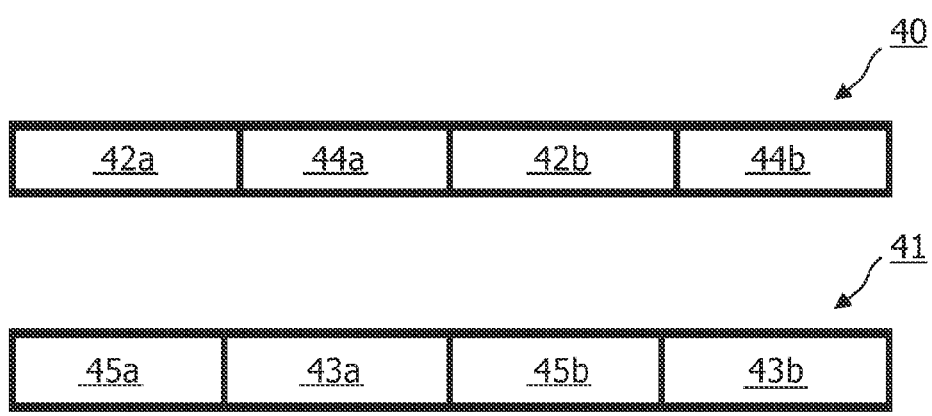
FIG. 4 illustrates schematically the speech activity in two channels representing speech signals from two users who are in active conversation.

Conversational turn-taking can be detected in several different ways. Referring to FIG. 4, there are shown two flows 40, 41 of audio information, one from one of the remote terminals 1, 2 and the other from a user of one of the individual phone units 12, 13 or the master phone unit 8. The latter flow 41 may in fact be obtained by segmenting an audio signal into segments associated with one of several users providing audio information to one of the phone units 8, 12, 13, using a segmentation technique such as described in WO 2007/086042, for example. The flows 40, 41 comprise periods 42, 43 of silence and periods 44, 45 of speech as determined by the SAD system 33 and SAD function 36.

The detection of a type of interaction corresponding to conversational turn-taking is based on a number of principles:

1. In a conversation, only one talker is active at any one time for the majority of the conversation;
2. Talkers take turns, such that the channels of the active/silent talker alternate;
3. Continuous silence in both channels means that there is no active conversational turn-taking between participants;
4. Non-alternating speech activity in one channel means that there is no conversational activity between channels, but e.g. a conversation between two callers picked up by the same remote terminal 1, 2.
5. If the turn-taking between periods 44, 45 of speech and periods 42, 43 of silence are not synchronized between channels, there is no conversational turn-taking between the channels in question. That is why the flows 40, 41 are analyzed over time in relation to each other.

A possible algorithm for detecting conversational turn-taking is the following: Let n be the audio frame index and $pl(n)$ be the likelihood that frame n in channel 1 contains speech as determined by the SAD system 33 or SAD function 36. In a simple example, the value of $pl(n)$ can be 0 (no speech) or 1 (speech). There are four state variables that are initialized to zero, Presence1, Presence2, Conflict, Silence. There are three further state variables that are initialized as follows:

$g1=0.9$;
$g2=0.99$; and
$g3=0.995$.

In pseudo-code, the algorithm runs as follows:
1. Determine the VAD status of the current frame n in channels 1 and 2 and evaluate:

```
if p1(n)>0 AND p2(n)==0,
    Presence1 := g1*Presence1+(1-g1);
    Presence2 := g2*Presence2;
    Conflict := g2*Conflict;
    Silence := g3*Silence;
end
if p2(n)>0 AND p1(n)==0,
    Presence2 := g1*Presence2+(1-g1);
    Presence1 := g2*Presence1;
    Conflict := g2*Conflict;
    Silence := g3*Silence;
end
if p2(n)>0 AND p1(n)>0,
    Presence1 := g2*Presence1+(1-g2);
    Presence2 := g2*Presence2+(1-g2);
    Conflict := g1*Conflict+(1-g1);
    Silence := g3*Silence;
end
if p2(n)==0 AND p1(n)==0,
    Presence1 := g3*Presence1;
    Presence2 := g3*Presence2;
    Conflict := g3*Conflict;
    Silence := g3*Silence+(1-g3);
end
```

Conversation(n)=Presence1+Presence2−Conflict−Silence;
2. n:=n+1 go to step 1.

The conversation is detected when the current value of Conversation(n) exceeds a certain threshold value. Thus, the algorithm evaluates information over time, because it is backward-looking, the state variables ensuring that the current value of Conversation is based on evaluation of preceding audio frames. At the same time, because it is a continuously evolving determination of whether a conversation exists, it is suitable as the basis for an output signal for controlling a device.

The basic method outlined above can be enhanced in various ways, depending on the available computational resources, amongst others. For example, in addition or as an alternative to the state variables Presence1, Presence2, Conflict, Silence, state variables computed over longer periods of observation (several audio frames) can be used. These include correlation or mutual information metrics computed over several minutes of speech activity detection values in two or more signals.

In a natural conversation, the listening participant often provides feedback to the talker in the form of short utterances ("Yes", "O.K.", "Really?", "Hmm.", etc.). This is often called backchannel speech activity. It can be detected separately within the flows 40,41 of audio information from one of the remote terminals 1,2 and from a user of one of the individual phone units 12,13 or the master phone unit 8, based on the fact that these utterances are short (<1 s.) and are separated by relatively long silences. The backchannel activity detection can be used as an additional state variable, or it can be used to modify e.g. the state variable Conflict, in that conflict is only detected when a time segment of overlapping speech activity does not represent backchannel activity from the other talker.

A further feature can be derived from the temporal fine-structure of turn-taking. For example, the time difference between the point in time between the end of a period 45 of speech activity in the second flow 41 of audio information and the start of a subsequent period 44 of speech activity in the first flow 40 of audio information and vice versa can be used as a measure of the quality of the conversational turn-taking. In the case of a conversation-like interaction, this time difference measured over several changes of speaker has a slightly positive mean value and low variance compared to non-conversational interaction. In the latter case, the time difference has a mean value zero and large variance.

To improve the accuracy with which changes of speaker are detected, speech activity detection can be augmented with an analysis of the contents of the audio information. In particular, for the flows 40,41 of audio information, the pitch can be analyzed. In many languages, a rising pitch before the end of a spoken utterance indicates a question to the other talker. If this is followed by the speech activity of the other, possibly after a small pause, this type of change can be labeled a Question-Answer structure, which can be characterized as a feature (state variable) in the conversation model used to detect conversation-like interactions.

It is observed that the algorithm described above in detail is based on the dynamic temporal evolution of a number of state variables determined using first-order integrators. Various different linear and non-linear filtering and integration algorithms can be used as an alternative.

Instead of using a linear combination of features to form a feature Conversation representing the likelihood of conversational activity, detection of a conversation can be based on other models than linear detection (or regression) models, including various types of data classification methods based on discriminant analysis, support vector machines and neural networks.

The feature Conversation can also be a continuous likelihood variable with values on a scale between 0 and 1, instead of being a binary variable.

Finally, instead of using fixed parameters for temporal evolution (g1, g2, g3) and detection logic (step 2), separate techniques can be used to optimize the parameters for different users and callers, or different contexts. For example, the conversation detector could be tuned separately for each pair of conversational partners of the system or each local user and identified regular remote caller. Similarly, the parameters and/or detection logic could differ depending on whether the signals communicating audio information that is being analyzed is from the first or second individual phone unit 12,13 or from the master phone unit 8.

Methods of conversation detection are generally quite difficult to implement in real-time. However, in a mediated environment such as a telecommunications system, their implementation becomes feasible at a lower computational cost, because it is already clear where each flow of audio information is coming from. This is in contrast to a system of conversation detection amongst persons in a room fitted with microphones, because there all the sound is captured, and must first be attributed to the various persons in the room.

Generally, the ambient telephone system in the building 4 provides a spatial audio Input/Output system that may be controlled such that a caller follows the user when the user moves from one of the spaces 5-7 to another. It is also possible to have multiple simultaneous calls with different users in the environment and also calls that are left open or resident in specific locations, but which are not active. In cases where there are several callers with whom a connection from the ambient telephone system is open at any given time, the user should be able to signal to the system which caller is going to be moved. For example, if a first user is having a conversation with a Caller A in a first space 5 and a second user is in conversation with a Caller B in the same space, then, when the first user moves to the second space 6, the system ensures that only the connection to Caller A moves to the second space 6. This requires tracking of the user, but also a determination of the active conversations in which the first user is engaged. This determination is carried out automatically, as explained below with reference to FIG. 5. There is also a possibility that Callers A and B are in conversation only with each other. In that scenario, the system can close down the connection between the ambient telephone system and the remote terminals 1,2 of callers A and B. The system may also detect that there is only conversation locally, i.e. a conversation between the first and second users not involving any external callers.

Figure 5:
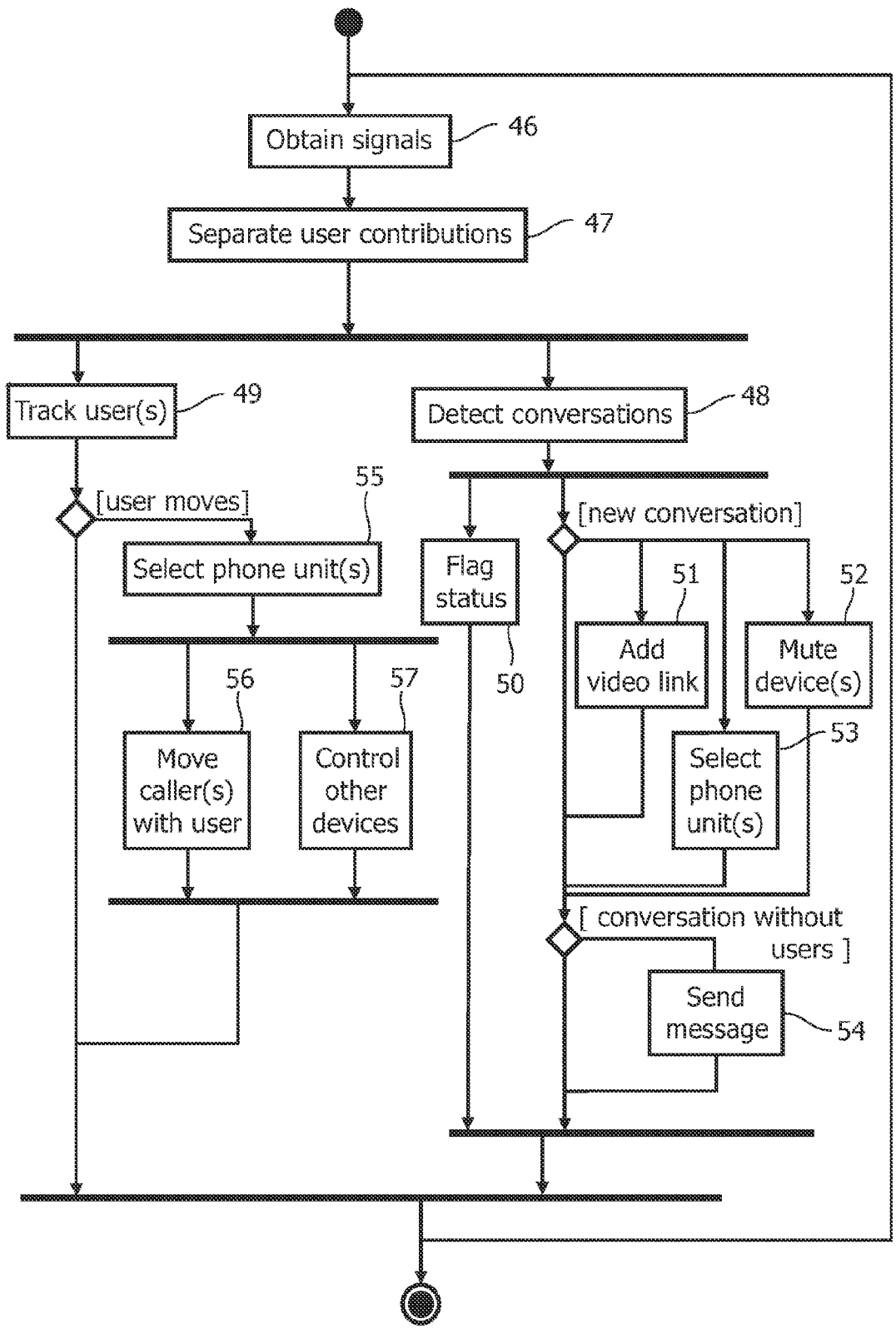
FIG. 5 is a flow chart illustrating several ways in which conversation detection is used to control session management, initiation and termination in the ambient telephone system.

Referring to FIG. 5, an outline is given of a method executed by the ambient telephone system and involving various exemplary control applications, in particular in the context of session management in a telephone/videoconference system.

In a first step 46, already detailed above, signals communicating information from at least one of the remote terminals 1,2 to the master phone unit 8 of the ambient telephone system in the building 4 are obtained. Additionally, the individual phone units 12,13 and master phone unit 8 obtain signals carrying audio information from users. Optionally (step 47) these local signals are segmented into contributions from different users, as explained.

Then, using e.g. the algorithm detailed above, the conversations are detected (step 48) by analyzing information communicated from the remote terminals 1,2 and local terminals over time in relation to each other using at least one criterion for detecting interaction of a type corresponding to conversational turn-taking between caller and user(s).

At the same time, users in the building 4 are tracked (step 49) to determine in which of the spaces 5-7 they are currently located. In one variant, users are tracked using tags, e.g. RFID (Radio Frequency Identification) tags and readers located within the building 4. In another embodiment, the users are tracked using audio-based localization methods, i.e. by determining the relative signal strengths of signals from the microphones 14-16. In this latter variant, users are not identified and tracked as such, but it is determined where each local participant in the conversations detected in the parallel step 48 is located. Other tracking methods can be used as alternatives or in combination in this step 49.

In case a particular local user is determined not to be taking part in a detected conversation, but audio information is nevertheless clearly communicated from the user, then at least one output signal for controlling a device in dependence on input received by at least one local input device may be provided by the master phone unit 8 or one of the individual phone units 12,13. In particular, voice input without there being a conversation can be used as a cue for enabling a voice-activated user interface to allow the user e.g. to set up a new connection (call a particular remote terminal 1,2), control the volume of the speakers 17-19 of the entertainment device 25, etc.

If, on the other hand, the user is determined to be taking part in a detected conversation, then an identification associated with the user is communicated (step 50) over the telecommunications network 3. This message is suitably a message over a peer-to-peer network to indicate the availability of the user for other activities or further conversation-like interactions. The message may include a further indication of the user's location as determined in the parallel step 49. Of course, communication of the status will also involve, if the user is determined to be in the building but not a participant in any of the detected conversations, transmitting a message communicating an identification associated with the user in combination with an indication that the user is available for a conversation-like interaction. It is observed that, where users are not individually identified, e.g. because only an audio-based location method is in use, an identification associated with the user may comprise merely an identification of the ambient telephone system, or possibly an identification of one of the local terminals represented by the individual phone units 12,13 and the master phone unit 8.

Especially in case a new conversation is detected, involving an individual phone unit 12,13 not hitherto in use for a conversation, for example the second phone unit 13, a video link to the remote caller can be opened (step 51) by providing a control signal to the second phone unit 13 and thence to the camera 20 and display device 22 attached thereto. Thus, for example, the contents of the display device 22 can change from entertainment to an image of the other call participants. Switching the camera 20 on only upon detecting a conversation between one or more callers and a user in the vicinity of the second phone unit 13 ensures that images from within the building 4 are not permanently transmitted, but only to remote terminals when needed. The user need not give any commands to provide this effect, but need merely engage in conversation.

Also in case a new conversation is detected, the entertainment device 25, which is arranged to produce an audible output unrelated to ongoing communications, can be muted (step 52), or at least the volume of the audible output can be reduced automatically, by providing the appropriate output signal for controlling the entertainment device 25. In this connection, totally switching off the entertainment device 25 is also considered and adjustment in volume.

In the illustrated embodiment, the detection of a conversation between a caller using one of the remote terminals 1,2 and a local user determined to be in the environment of one of the phone units 12,13 is used to select a phone unit (step 53) at which the audio signal from the particular one of the remote terminals 1,2 is to be reproduced, and to cause the audio information to cease to be reproduced by the other phone units 8,12,13. Thus, where previously a connection was open to all phone units 8,12,13, detection of a conversation between a user next to one of them and a remote caller will cause the audio information communicated from the particular remote terminal 1,2 in use by the remote caller to be reproduced at a selected sub-set of the local output devices (i.e. speakers 17-19), which may be only one such output device. Similarly, upon detecting that the local user is communicating information from fewer than all of the input devices (i.e. microphones 14-16), either by determining the user's location or by monitoring the relative strengths and/or contents of the audio signals from these devices, a selection of microphones 14-16 from which information is communicated to the remote terminal 1,2 in use by the caller is adjusted. The remote caller will thus be provided with more clearly intelligible audio information.

It is observed that the ambient telephone system also analyses information communicated from two remote terminals 1,2 in relation to each other using at least one criterion for detecting interaction of a type corresponding to conversational turn-taking between users of the remote terminals. It can happen that this analysis yields the conclusion that there is an active conversation between the users of the remote terminals 1,2 not involving any users in the building 4. In that case, the master phone unit 8 transmits (step 54) a message to the remote terminals 1,2, informing them of the identities of the callers and/or their telecommunication terminals and indicating that a direct conversation is possible. This message can, for example, be in accordance with the SIP (Session Initiation Protocol) protocol. If and when the callers using the remote terminals 1,2 accept the message, a new call between the callers using the remote terminals 1,2 is established, which is no longer relayed through the master phone unit 8 in the building 4. Thus, upon detecting that the at least one criterion for detecting a conversation-like interaction is met in respect of users of a set of telecommunication terminals including only remote terminals 1,2, the master phone unit 8 provides at least one signal identifying the set of remote terminals 1,2 for establishing a direct connection between only the remote terminals 1,2 forming the set. In the present example the signals are sent to those terminals, but in another embodiment a signal may be sent to some sort of exchange managing connections over the network 3.

If a user moves within the building 4, this is detected (step 49). It is known which conversation-like interaction that particular user is engaged in (step 48). Having detected which conversation-like interactions the user is participating in, and in particular with the users of which remote terminals 1,2, a step 55 of selecting which phone unit 8,12,13 to "move" the external caller to is carried out. This step 55 is similar to the corresponding step 53 carried out upon detecting a new conversation. In particular, a selection of local input devices (i.e. microphones 14-16) from which information is communicated to the remote terminal 1,2 concerned is adjusted.

Having determined the most appropriate one of the phone units 8,12,13 that the user is to use following his or her change of location, the external caller is moved 56. That is to say that, upon detecting that there is no longer a conversation at a first of the phone units 8,12,13 between a local user and a user of a particular one of the remote terminals 1,2, the information from that particular remote terminal ceases to be reproduced at the first of the phone units 8,12,13. It is caused to commence to be reproduced at a different one of the phone units 8,12,13 following localization of the user.

Furthermore, external devices in the neighborhood of the new phone unit 8,12,13 are controlled upon detecting that a conversation-like interaction has moved with the user to the new phone unit. In particular, the entertainment device 25 may be muted, a video link may be opened, and the illumination device 24 may be controlled to light up the environment of the second phone unit 13 in order to improve the picture quality provided over the video link, or in any case to emphasize who the speaker is.

All the above-mentioned adjustments are made, and indeed made possible, by detecting a conversation-like interaction between a user of one of the remote terminals 1,2 and a local user. Additional user inputs using control panels or remote control units are in principle not required.

It should be noted that the above-mentioned embodiments illustrate, rather than limit, the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

For example, instead of using individual phone units 12,13, an ambient telephony system may be implemented with just one terminal interfacing with microphones and speakers distributed about the building 4.

Although the method of detecting conversations has been explained using an example in which speech activity is detected, a content-based analysis may be used in addition or as an alternative to detect the presence of speech. Moreover, where a video link is provided, video analysis can be used in relation to the audio and/or video signals to determine whether a conversation-like interaction is taking place. For example, a lack of movement, or a detection of a listening pose in a video image of a remote user whilst audio information is being communicated from a local user will be a good indicator of a conversation-like interaction. Similarly, periods of lack of movement or a listening pose interspersed with periods of active body movement may also be a good indication of a conversation-like interaction. Where flows of postings to "whiteboard" environments are being analyzed, similar methods can be used to distinguish between different conversation-like interactions.

The invention claimed is:

1. A method of controlling a conversation in an ambient telephone environment having a plurality of spaces including a respective plurality of local terminals with a first terminal of the plurality of local terminals connected to a telecommunications network for enabling communication with at least one remote terminal, the method comprising acts of:
   obtaining signals communicating a conversation between a local user of the first terminal of the plurality of local terminals and a second user of one of a second terminal of the plurality of local terminals and the at least one remote terminal, the local terminals including at least one device of a plurality of devices;
   analyzing the signals over time in relation to each other for detecting, based on at least one criterion, an interaction of a type corresponding to conversational turn-taking;
   upon detecting the interaction of the type corresponding to the conversational turn-taking, inferring a position of the local user based on known positions of the at least one device of the first terminal on which the conversation is detected;
   communicating an identification, availability, and location associated with the local user;
adjusting at least one output signal for controlling the at least one device upon determining whether the at least one criterion is met;
   detecting a remote conversation relayed through a master device of the ambient telephone environment between two remote users of two remote terminals located external to the ambient telephone environment and not involving any users located within the ambient telephone environment;
   in response to the act of detecting the remote conversation, transmitting a message by the master device informing the remote users that a direct conversation is possible; and
   in response to acceptance of the message, establishing a new call between the two remote users, wherein the new call is no longer relayed through the master device.

2. The method according to claim 1, wherein the telecommunications network includes at least one of the Internet, one or more cellular telephone networks, and a land line telephone network.

3. The method according to claim 1, wherein presence of the local user is determined by one of providing the local user with tags selected at least from Radio Frequency Identification tags and audio-based localization methods.

4. The method according to claim 1, further comprising acts of:
    setting up a new connection to the obtained conversation for a further local user when presence of the further local user is determined and the further local user is not taking part in the obtained conversation; and
    controlling volume of a speakerphone system in vicinity of the further local user.

5. The method of claim 1, further comprising an act of tracking movements of the local user in the environment to determine location of the local user in the environment by detecting where the first terminal on which the local user is participating in the conversation is located.

6. A telecommunications system for controlling a conversation in an ambient telephone environment having a plurality of spaces, the system comprising:
    a plurality of local terminals respectively distributed in the plurality of spaces of the environment for use by one or more users, a first terminal of the plurality of local terminals establishing a connection with a telecommunications network for enabling communication with one or more remote terminals; and
    a processor configured to
    obtain signals communicating a conversation between a local user of the first terminal of the plurality of local terminals and a second user of one of a second terminal of the plurality of local terminals and the at least one remote terminal, the local terminals including at least one device of a plurality of devices,
    analyze the signals over time in relation to each other for detecting, based on at least one criterion, an interaction of a type corresponding to conversational turn-taking,
    upon detecting the interaction of the type corresponding to the conversational turn-taking, infer a position of the local user based on known positions of the at least one device of the first terminal on which the conversation is detected,
    communicate an identification, availability, and location associated with the local user, and
    adjust at least one output signal for controlling the at least one device upon determining whether the at least one criterion is met;
    detect a remote conversation relayed through a master device of the ambient telephone environment between two remote users of two remote terminals located external to the ambient telephone environment and not involving any users located within the ambient telephone environment;
    in response to detection of the remote conversation, transmitting a message by the master device informing the remote users that a direct conversation is possible; and
    in response to acceptance of the message, establishing a new call between the two remote users, wherein the new call is no longer relayed through the master device.

7. The telecommunications system of claim 6, wherein the processor is further configured to track movements of the local user in the environment to determine location of the local user in the environment.

8. The telecommunications system according to claim 6, wherein the plurality of devices comprises a speakerphone system including arrays of loudspeakers, microphones, and video terminals distributed in the environment and connected to each other via a local network.

9. The telecommunications system according to claim 8, wherein the processor is configured to establish a video link between the terminals of the local and second users in response to the act of detecting the interaction.

10. The telecommunications system according to claim 8, wherein the processor is configured to adjust the volume of audible output of the speakerphone system.

11. The telecommunications system according to claim 8, wherein the processor is configured to cause the conversation to cease to be reproduced by the speakerphone system.

12. The telecommunications system according to claim 8, wherein the processor is configured to cause the conversation to be reproduced by the speakerphone system.

13. The telecommunications system according to claim 8, wherein the processor is configured to controlling the speakerphone system in dependence on preferences of the local user.

14. The telecommunications system according to claim 8, wherein the processor is configured to mute a video terminal and control the volume of loudspeakers.

15. The telecommunications system according to claim 8, wherein the processor is configured to:
    set up a new connection to the obtained conversation for a further local user when presence of the further local user is determined and the further local user is not taking part in the obtained conversation; and
    control volume of the speakerphone system in vicinity of the further local user.

16. The telecommunications system according to claim 6, wherein the processor is configured to adjust a selection of the at least one of the plurality of devices from which the conversation is communicated to the second terminal.

17. The telecommunications system according to claim 6, wherein the telecommunications network includes at least one of the Internet, one or more cellular telephone networks, and a land line telephone network.

18. The telecommunications system according to claim 6, wherein the processor is configured to determine the presence of the local user by one of: providing the local user with tags selected at least from Radio Frequency Identification tags; audio-based localization methods; or a combination of these acts.

19. The telecommunications system of claim 6, wherein the processor is configured to:
    detect the conversation by an input device of a new local terminal located at a new location when the local user moves to the new location; and
    in response to detecting the conversation, selecting the new local terminal at the new location for communication with the second user by activating an output device of the new local terminal for continuing the conversation between the local user and the second user through the new local terminal and ceasing reproduction of the conversation at an output device of the first terminal, and controlling external devices in neighborhood of the new local terminal including at least one of muting an entertainment device, opening a video link including controlling a display of the new local terminal to display an image of the second user and turning on a camera of the new local terminal, and controlling an illuminator to illuminate the new location to emphasize the local user.

20. A computer readable medium that is not a transitory propagating signal or wave, and comprising computer instructions which, when executed by a processor, configure the processor to perform a method of controlling a conversation in an ambient telephone environment having a plurality of spaces including a respective plurality of local terminals with a first terminal of the plurality of local terminals connected to a telecommunications network for enabling communication with at least one remote terminal, the method comprising acts of:

obtaining signals communicating a conversation between a local user of the first terminal of the plurality of local terminals and a second user of one of a second terminal of the plurality of local terminals and the at least one remote terminal, the local terminals including at least one device of a plurality of devices;

analyzing the signals over time in relation to each other for detecting an interaction of a type corresponding to conversational turn-taking;

upon detecting the interaction of the type corresponding to the conversational turn-taking, inferring a position of the local user based on known positions of the at least one device of the first terminal on which the conversation is detected;

communicating an identification, availability, and location associated with the local user;

adjusting at least one output signal for controlling the at least one device upon determining whether the at least one criterion is met;

detecting a remote conversation relayed through a master device of the ambient telephone environment between two remote users of two remote terminals located external to the ambient telephone environment and not involving any users located within the ambient telephone environment;

in response to the act of detecting the remote conversation, transmitting a message by the master device informing the remote users that a direct conversation is possible; and in response to acceptance of the message, establishing a new call between the two remote users, wherein the new call is no longer relayed through the master device.

21. The computer readable medium of claim 20, further comprising an act of tracking movements of the local user in the environment to determine location of the local user in the environment.

* * * * *